United States Patent [19]

Kodama et al.

[11] Patent Number: 5,093,419
[45] Date of Patent: Mar. 3, 1992

[54] THERMOPLASTIC RESIN COMPOSITION

[75] Inventors: Mikio Kodama, Hirakata; Motoichi Yano, Settsu; Katsuji Abe, Ibaraki, all of Japan

[73] Assignee: Sumitomo Naugatuck Co., Ltd., Osaka, Japan

[21] Appl. No.: 492,765

[22] Filed: Mar. 13, 1990

[30] Foreign Application Priority Data

Mar. 17, 1989 [JP] Japan .................................. 1-66597

[51] Int. Cl.$^5$ ..................... C08L 67/02; C08L 33/20; C08L 55/02
[52] U.S. Cl. ........................................ 525/64; 525/66; 525/67; 525/68
[58] Field of Search .......................................... 525/64

[56] References Cited

U.S. PATENT DOCUMENTS 3,954,903  5/1976  Kudo et al. ..................... 525/186 X
4,594,387  6/1986  Muramatsu ........................... 525/67
4,861,817  8/1989  Erpelding ............................. 525/64

OTHER PUBLICATIONS

Hack's Chemical Dictionary p. 533 4th ed. McGraw-Hill Book Co. N.Y. 1969.

Primary Examiner—Patricia Short

[57] ABSTRACT

A thermoplastic resin composition comprising (A) 5 to 50 parts by weight of a saturated polyester resin, (B) 10 to 70 parts by weight of a graft polymer obtainable by polymerizing an aromatic vinyl compound and an unsaturated nitrile in the presence of a conjugated diene base rubber, (C) 10 to 70 parts by weight of an α-alkylstyrene-unsaturated nitrile copolymer comprising 50 to 85% by weight of the α-alkylstyrene and 50 to 15% by weight of the unsaturated nitrile, provided that the total amount of the components (A), (B) and (C) is 100 parts by weight, wherein the content of the conjugated diene base rubber in the composition is from 5 to 30% by weight, which composition provides a molded article having improved properties such as chemical resistance, impact resistance, flexural modulus, heat resistance and dimensional stability.

5 Claims, No Drawings

THERMOPLASTIC RESIN COMPOSITION

BACKGROUND OF THE INVENTION

1. Field of the Invention

The present invention relates to a thermoplastic resin which gives a molded article having good impact resistance, flexural modulus, chemical resistance, heat resistance and dimensional stability.

2. Description of the Related Art

ABS resins have well balanced physical properties and dimensional stability and are used in various fields. However, if some corrosive materials such as gasoline, brake fluids or rust preventive oils adhere to the ABS resin, the resin tends to crack. Therefore, it has been desired for a long time to improve the resistance of ABS resin against various chemical materials.

As a resin having good chemical resistance, a saturated polyester resin is known, but has inferior impact resistance, in particular notched Izod impact strength and, in addition, poor dimensional stability.

Japanese Patent Kokai Publication No. 219362/1984 proposes the addition of a small amount of the saturated polyester resin to a specific ABS resin composition comprising a styrene-acrylonitrile base copolymer having a specific intrinsic viscosity to provide a resin composition having improved chemical resistance, dimensional stability and weld strength without deteriorating good physical properties of the ABS resin. However, the obtained resin composition is not necessarily satisfactory in heat resistance and the balance between flexural modulus and impact resistance. To improve only heat resistance, Japanese Patent Kokai Publication No. 11347/1984 proposes a composition comprising the saturated polyester resin and an α-methylstyrene-methacrylate copolymer which is optionally reinforced with a rubber. But, such resin composition is inferior in the balance between flexural modulus and impact resistance. In addition, silver streaks are generated on the molded article surfaces. Then, such resin composition is not a practically attractive material.

SUMMARY OF THE INVENTION

An object of the present invention is to provide a resin composition comprising a saturated polyester resin and an ABS resin, which has not only good chemical resistance and heat resistance but also good dimensional stability and balance between flexural modulus and impact resistance.

This and other objects are achieved by a thermoplastic resin composition comprising (A) 5 to 50 parts by weight of a saturated polyester resin, (B) 10 to 70 parts by weight of a graft polymer obtainable by polymerizing an aromatic vinyl compound and an unsaturated nitrile in the presence of a conjugated diene base rubber, (C) 10 to 70 parts by weight of an α-alkylstyrene-unsaturated nitrile copolymer comprising 50 to 85% by weight of the α-alkylstyrene and 50 to 15% by weight of the unsaturated nitrile, provided that the total amount of the components (A), (B) and (C) is 100 parts by weight, wherein the content of the conjugated diene base rubber in the composition is from 5 to 30% by weight.

If the α-alkylstyrene-unsaturated nitrile copolymer alone is added to the ABS resin, the impact resistance and processability of the resin composition is deteriorated although the heat resistance of the composition is improved. However, when the composition comprises the saturated polyester resin, the ABS resin and the α-alkylstyrene-unsaturated nitrile copolymer, it has not only good heat resistance but also good impact resistance.

To improve the impact resistance of the composition comprising the ABS resin and polyester, it can be contemplated to increase the content of the rubber in the composition, namely to use the ABS resin containing the rubber in a high proportion. However, the flexural modulus of the resin composition is greatly deteriorated.

In the composition of the present invention, the addition of the α-alkylstyrene-unsaturated nitrile copolymer improves the flexural modulus. Therefore, even the resin composition containing the rubber in a low content can have good flexural modulus and impact resistance.

DETAILED DESCRIPTION OF THE INVENTION

The components of the resin composition of the present invention are explained.

Saturated polyester resin (A)

As the saturated polyester resin (A) to be contained in the resin composition of the present invention, are exemplified polyethylene terephthalate, polytetramethylene terephthalate, polybutylene terephthalate and mixtures thereof. Among them, polybutylene terephthalate is preferred.

There is no limitation on the structure of the saturated polyester resin (A). Preferably, the saturated polyester resin (A) has a viscosity average molecular weight of 18,000 to 88,000 (in a mixed solvent of phenol and tetrachloroethane in a weight ratio of 1:1, at room temperature) in view of balance among the physical properties. The saturated polyester resin (A) may be prepared by any of the conventional methods.

Graft polymer (B)

As the conjugated diene base rubber in the graft polymer (B), are exemplified polybutadiene, butadiene-styrene copolymer, butadiene-acrylonitrile copolymer and mixtures thereof. A particle size, a gel content and other properties of the conjugated diene base rubber are not critical.

Examples of the aromatic vinyl compound are styrene, α-methylstyrene, dimethylstyrene, vinyltoluene and mixtures thereof. Among them, styrene is preferred.

Examples of the unsaturated nitrile are acrylonitrile, methacryloyl nitrile and mixtures thereof. Among them, acrylonitrile is preferred.

A composition, a graft ratio, a particle size and the like of the graft polymer (B) are not critical. In view of the balance among the physical properties of the resin composition and the content of the conjugated diene base rubber in the resin composition being 5 to 30% by weight, preferably the graft polymer (B) has a weight average particle size of 0.05 to 5 μm and comprises 20 to 70% by weight of the conjugated diene base rubber, 60 to 15% by weight of the aromatic vinyl compound and 10 to 40% by weight of the unsaturated nitrile.

The graft polymer (B) may be prepared by any of the conventional methods such as emulsion polymerization, suspension polymerization, bulk polymerization, solution polymerization and combinations thereof.

α-Alkylstyrene-unsaturated nitrile base copolymer (C)

Examples of the α-alkylstyrene in the copolymer (C) are α-methylstyrene, α-ethylstyrene, methyl-α-methylstyrene and mixtures thereof. Among them, α-methylstyrene is preferred.

Examples of the unsaturated nitrile are acrylonitrile, methacrylonitrile and mixtures thereof. Among them, acrylonitrile is preferred.

The copolymer comprises 50 to 85% by weight of the α-alkylstyrene, 50 to 15% by weight of the unsaturated nitrile and 0 to 25% by weight of styrene. Outside these ranges, the resin composition does not achieve the objects of the present invention.

The properties of the copolymer (C) such as an intrinsic viscosity are not critical. In view of the processability of the obtained resin composition, the intrinsic viscosity of the copolymer (C) is preferably from 0.3 to 1.0 (in dimethylformamide at 30° C.). The copolymer may be prepared by any of the conventional methods such as emulsion polymerization, bulk polymerization, suspension polymerization, solution polymerization and combinations thereof.

Composition

The resin composition comprises 5 to 50 parts by weight of the saturated polyester resin (A), 10 to 70 parts by weight of the graft polymer and 10 to 70 parts by weight of the copolymer (C) provided that the total of the components (A), (B) and (C) is 100 parts by weight. Outside these ranges, the resin composition cannot achieve the objects of the present invention. In view of chemical resistance, heat resistance, the balance between flexural modulus and impact resistance and processability, the resin composition of the present invention preferably comprises 10 to 45 parts by weight of the saturated polyester resin (A), 20 to 50 parts by weight of the graft polymer (B) and 15 to 60 parts by weight of the copolymer (C).

In the resin composition of the present invention, the content of the conjugated diene base rubber is from 5 to 30% by weight based on the weight of the resin composition. Outside this range, the objects of the present invention cannot be achieved. In view of the balance between flexural modulus and impact resistance and the processability, the content of the conjugated diene base rubber is preferably from 10 to 25% by weight.

The resin composition of the present invention may be prepared by mixing the saturated polyester resin (A), the graft polymer (B) and the copolymer (C) by a per se conventional method with a known kneading apparatus such as a Banbury mixer, an extruder and the like. Three components is mixed at once, or two of them are first mixed and then the remaining one is further mixed.

During mixing the components, conventionally used additives such as a stabilizer, a dye or a pigment, a plasticizer, an antistatic agent, an ultraviolet light absorbing agent, a lubricant and a filler, or other thermoplastic resins such as polycarbonate, polyamide, polyphenylene ether may be added.

PREFERRED EMBODIMENTS OF THE INVENTION

The present invention will be illustrated by following Examples, in which "parts" are by weight unless otherwise indicated.

Examples and Comparative Examples

A saturated polyester, a graft polymer and a copolymer were kneaded in a single-screw extruder in a composition shown in Tales 1 and 2.

The properties of the prepared compositions are shown Tables 3 and 4.

In Examples and Comparative Examples, following saturated polyesters, graft polymers and copolymers were used.

Saturated polyester resin (A)

(i) Commercially available polybutylene terephthalate
(Viscosity average molecular weight: 31,000)
(ii) Commercially available polyethylene terephthalate
(Viscosity average molecular weight: 34,000)

Graft polymer (B)

(i) A graft polymer (B-1) was prepared by polymerizing styrene (37.5 parts) and acrylonitrile (12.5 parts) in a polybutadiene latex (gel content: 85%, a particle size: 0.41 μm) (50 parts of the solid component) by the conventional emulsion polymerization.

(ii) A graft polymer (B-2) was prepared by polymerizing styrene (20 parts), α-methylstyrene (22 parts) and acrylonitrile (18 parts) in a polybutadiene latex (gel content: 80%, a particle size: 0.35 μm) (40 parts of the solid component) by the conventional emulsion polymerization.

(iii) A graft polymer (B-3) was prepared by polymerizing styrene (50 parts) and acrylonitrile (20 parts) in a styrene-butadiene copolymer latex (gel content: 87%, a particle size: 0.40 μm, styrene content: 10% by weight) (30 parts of the solid component) by the conventional emulsion polymerization.

Copolymer (i) A copolymer (C-1) having the intrinsic viscosity of 0.50 was prepared by copolymerizing α-methylstyrene (75 parts) and acrylonitrile (25 parts) by the conventional emulsion polymerization.

(ii) A copolymer (C-2) having the intrinsic viscosity of 0.65 was prepared by copolymerizing α-methylstyrene (65 parts), acrylonitrile (25 parts) and styrene (10 parts) by the conventional emulsion polymerization.

(iii) A copolymer (X-1) having the intrinsic viscosity of 0.80 was prepared by copolymerizing α-methylstyrene (40 parts), acrylonitrile (25 parts) and styrene (35 parts) by the conventional emulsion polymerization.

(iv) A copolymer (X-2) having the intrinsic viscosity of 0.70 was prepared by copolymerizing styrene (75 parts) and acrylonitrile (25 parts) by the conventional emulsion polymerization.

(v) A copolymer (X-3) was prepared by polymerizing α-methylstyrene (51 parts) and methylstyrene (34 parts) in a polybutadiene latex (gel content: 85%, a particle size: 0.41 μm) (15 parts of the solid component) by the conventional emulsion polymerization.

TABLE 1

| Example No. | C. 1 | C. 2 | 1 | 2 | C. 3 | C. 4 | 3 | 4 | C. 5 | 5 | C. 6 |
|---|---|---|---|---|---|---|---|---|---|---|---|
| Saturated polyester resin (A) | | | | | | | | | | | |
| PBT (parts) | | | 20 | 20 | 20 | 30 | 30 | 30 | 30 | 30 | 30 |
| PET (parts) | | | | | | | | | | | |
| Graft polymer (B) | | | | | | | | | | | |
| B-1 (parts) | 30 | 30 | | | | | | | | | |
| B-2 (parts) | | | | | | | 45 | 35 | 35 | 25 | 5 |
| B-3 (parts) | | | 55 | 35 | 35 | 65 | | | | | |
| Copolymer (C) | | | | | | | | | | | |
| C-1 (parts) | 70 | | 25 | 45 | | | | | | | |
| C-2 (parts) | | | | | | | 25 | 35 | | 45 | 65 |
| Copolymer (X) | | | | | | | | | | | |
| X-1 (parts) | | | | | 45 | 5 | | | | | |
| X-2 (parts) | | 70 | | | | | | | 35 | | |
| X-3 (parts) | | | | | | | | | | | |
| Rubber content (% by weight) | 15.0 | 15.0 | 16.5 | 10.5 | 10.5 | 19.5 | 18.0 | 14.0 | 14.0 | 10.0 | 2.0 |

TABLE 2

| Example No. | C. 7 | 6 | C. 8 | 7 | C. 9 | 8 | C. 10 | C. 11 | C. 12 | C. 13 |
|---|---|---|---|---|---|---|---|---|---|---|
| Saturated polyester resin (A) | | | | | | | | | | |
| PBT (parts) | 40 | 40 | 40 | 40 | 40 | | | 40 | 60 | 60 |
| PET (parts) | | | | | | 40 | 40 | | | |
| Graft polymer (B) | | | | | | | | | | |
| B-1 (parts) | | 35 | 35 | | | 15 | 15 | | 5 | 25 |
| B-2 (parts) | | | | 25 | 25 | | | | | |
| B-3 (parts) | 55 | | | | | | | | | |
| Copolymer (C) | | | | | | | | | | |
| C-1 (parts) | | 25 | | 35 | | 45 | | | | 15 |
| C-2 (parts) | | | | | | | | | | |
| Copolymer (X) | | | | | | | | | | |
| X-1 (parts) | 5 | | 25 | | | | | | | |
| X-2 (parts) | | | | | 35 | | 45 | | | |
| X-3 (parts) | | | | | | | | 60 | | |
| Rubber content (% by weight) | 16.5 | 17.5 | 17.5 | 10.0 | 10.0 | 7.5 | 7.5 | 9.0 | 2.5 | 12.5 |

TABLE 3

| Example No. | C. 1 | C. 2 | 1 | 2 | C. 3 | C. 4 | 3 | 4 | C. 5 | 5 | C. 6 |
|---|---|---|---|---|---|---|---|---|---|---|---|
| Chemical resistance[*1] (presence of crack) | | | | | | | | | | | |
| Brake fluid | Yes | Yes | No | No | Yes | Yes | No | No | Yes | No | Yes |
| Rust preventive oil | Yes | Yes | No | No | No | No | No | No | No | No | No |
| Heat resistance[*2] (°C.) | 108 | 88 | 93 | 98 | 82 | 78 | 90 | 94 | 78 | 96 | 80 |
| (Flexural modulus) $\times 10^{4}$[*3] (kg/cm²) (C) | 2.3 | 2.3 | 2.0 | 2.3 | 2.3 | 2.0 | 2.1 | 2.2 | 2.2 | 2.4 | 2.5 |
| Impact resistance[*4] (kg·cm/cm) | 10 | 20 | 17 | 12 | 3 | 8 | 19 | 16 | 4 | 10 | 2 |
| Dimensional stability (mm) | 0 | 0 | 0 | 0 | 0.1 | 0.11 | 0.05 | 0.06 | 0.21 | 0.08 | 0.32 |

TABLE 4

| Example No. | C. 7 | 6 | C. 8 | 7 | C. 9 | 8 | C. 10 | C. 11 | C. 12 | C. 13 |
|---|---|---|---|---|---|---|---|---|---|---|
| Chemical resistance[*1] (presence of crack) | | | | | | | | | | |
| Brake fluid | No | No | No | No | No | No | No | No | No | No |
| Rust preventive oil | No | No | No | No | No | No | No | No | No | No |
| Heat resistance[*2] (°C.) | 78 | 96 | 93 | 97 | 77 | 98 | 65 | 93 | 65 | 68 |
| Toughness $\times 10^{3}$[*3] (kg/cm²) (C) | 2.2 | 2.2 | 2.2 | 2.3 | 2.3 | 2.3 | 2.3 | 2.4 | 2.4 | 2.3 |
| Impact resistance[*4] (kg·cm/cm) | 6 | 18 | 5 | 13 | 5 | 10 | 3 | 4 | 2 | 5 |
| Dimensional[*5] | 0.33 | 0.13 | 0.39 | 0.12 | 0.37 | 0.20 | 0.43 | 0.45 | 0.51 | 0.48[*6] |

TABLE 4-continued

| Example No. | C. 7 | 6 | C. 8 | 7 | C. 9 | 8 | C. 10 | C. 11 | C. 12 | C. 13 |
|---|---|---|---|---|---|---|---|---|---|---|
| stability (mm) | | | | | | | | | | |

Note:
*1) A disc plate of 130 in diameter and 3 mm in thickness which has, at its center, a boss of 3.2 mm in inner diameter, 9.0 mm in outer diameter and 25 mm in height is injection molded. In the boss, a self tapping screw (JIS type 2, M 4 × 12 mm) and a washer of 1 mm in thickness are screwed at a torque of 15 kg/cm and the plate having the screw and the washer is completely dipped in the brake fluid or the rust preventive oil at room temperature for one hour. Then, the article is removed from the test fluid and the formation of crack is inspected.
*2) ASTM D-648; thickness of ¼ inch and load of 18.6 kg/cm².
*3) ASTM D-790.
*4) ASTM D-256; thickness of ¼ inch, notched Izod impact strength.
*5) A disc of 100 mm in diameter and 2 mm thickness is injection molded at the resin temperature of 280 to 285° C. and a degree of warp is observed on a base plate.
*6) On the surface of the test disc, many silver streaks were found.

As understood from the results in Tables, the addition of the α-methylstyrene-acrylonitrile copolymer to the graft polymer improved the heat resistance but decreased the impact strength in comparison to the addition of the styrene-acrylonitrile copolymer to the graft copolymer.

The addition of the α-methylstyrene-acrylonitrile copolymer to the saturated polyester resin and the graft polymer improved not only the heat resistance but also the impact strength greatly.

What is claimed is:

1. A thermoplastic resin composition comprising (A) 20 to 40 parts by weight of a saturated polyester resin having a viscosity average molecular weight ranging from 18,000 to 88,000 and selected from the group consisting of polyethylene terephthalate, polybutylene terephthalate and mixtures thereof, (B) 15 to 55 parts by weight of a graft polymer obtainable by polymerizing an aromatic vinyl compound and an unsaturated nitrile in the presence of a conjugated diene base rubber, (C) 25 to 45 parts by weight of α-alkylstyrene-unsaturated nitrile copolymer comprising 65 to 85% by weight of the α-alkylstyrene and 25 to 15% by weight of the unsaturated nitrile, provided that the total amount of the components (A), (B) and (C) is 100 parts by weight, wherein the content of the conjugated diene base rubber in the composition is from 5 to 30% by weight.

2. The thermoplastic resin composition according to claim 1, wherein the saturated polyester resin (A) is polybutylene terephthalate.

3. The thermoplastic resin composition according to claim 1, wherein the graft polymer (B) has a weight average particle size of 0.05 to 5 μm.

4. The thermoplastic resin composition according to claim 1, wherein the graft polymer (B) comprises 20 to 70% by weight of the conjugated diene base rubber, 60 to 15% by weight of the aromatic vinyl compound and 10 to 40% by weight of the unsaturated nitrile.

5. A thermoplastic resin composition comprising (A) 10 to 45 parts by weight of a saturated polyester resin having a viscosity average molecular weight ranging from 18,000 to 88,000 and selected from the group consisting of polyethylene terephthalate, polybutylene terephthalate and mixtures thereof, (B) 20 to 50 parts by weight of a graft copolymer obtainable by polymerizing an aromatic vinyl compound and an unsaturated nitrile in the presence of a conjugated diene base rubber, (C) 15 to 60 parts by weight of α-alkylstyrene-unsaturated nitrile copolymer comprising 50 to 85% by weight of the α-alkylstyrene and 50 to 15% by weight of the unsaturated nitrile, provided that the total amount of the components (A), (B) and (C) is 100 parts by weight, wherein the content of the conjugated diene base rubber in the composition is from 5 to 30% by weight.

* * * * *